US00RE48010E

(19) United States
(12) Reissued Patent
Ciavarella et al.

(10) Patent Number: US RE48,010 E
(45) Date of Reissued Patent: May 26, 2020

(54) DISPENSER USING ELECTRICALLY ACTIVATED MATERIAL

(71) Applicant: GOJO Industries, Inc., Akron, OH (US)

(72) Inventors: Nick Ermanno Ciavarella, Seven Hills, OH (US); Scott Theodore Proper, Stow, OH (US); Alexander York, Vilas, NC (US); Jason Thomas Dunn, Minneapolis, MN (US)

(73) Assignee: GOJO Industries, Inc., Akron, OH (US)

(21) Appl. No.: 15/984,765

(22) Filed: May 21, 2018

Related U.S. Patent Documents

Reissue of:
(64) Patent No.: 9,517,484
Issued: Dec. 13, 2016
Appl. No.: 14/662,539
Filed: Mar. 19, 2015

U.S. Applications:
(63) Continuation-in-part of application No. 14/489,850, filed on Sep. 18, 2014, now Pat. No. 9,610,600.
(Continued)

(51) Int. Cl.
*B65D 83/00* (2006.01)
*B05B 11/00* (2006.01)
(Continued)

(52) U.S. Cl.
CPC ..... *B65D 83/0055* (2013.01); *A47K 5/1208* (2013.01); *A47K 5/1211* (2013.01);
(Continued)

(58) Field of Classification Search
None
See application file for complete search history.

(56) References Cited

U.S. PATENT DOCUMENTS 2,884,164 A * 4/1959 Kleid ..... B05B 11/3032 222/182
3,162,333 A * 12/1964 Davidson ..... B05B 11/3032 222/207
(Continued)

FOREIGN PATENT DOCUMENTS

DE 19950160 A1 4/2001
DE 10234584 B3 4/2004
(Continued)

OTHER PUBLICATIONS

Thummala, et al., "Analysis of Dielectric Electro Active Polymer Actuator and its High Voltage Driving Circuits", Published in: Power Modulator and High Voltage Conference (IPMHVC), 2012 IEEE International, pp. 458-461, Jun. 3-7, 2012, http://ieeexplore.ieee.org/xpl/login.jsp?tp=&arnumber=6518779&url=http%3A%2F%2Fieeexplore.ieee.org%2Fxpls%2Fabs_all.jsp%BFarnumber%3D6518779.
(Continued)

*Primary Examiner* — Glenn K Dawson
(74) *Attorney, Agent, or Firm* — Cooper Legal Group LLC

(57) ABSTRACT

A pump for dispensing fluid includes a dome portion for storing the fluid received through a pump inlet. The dome portion is movable between a compressed state and an uncompressed state. The pump includes a flexible membrane having a first pliability when a first voltage is applied and a second pliability when a second voltage is applied. The pump includes a first biasing device that applies a first force in a first direction to the flexible membrane. The flexible membrane moves the dome portion from the uncompressed state to the compressed state. The pump includes a second biasing device that applies a second force in a second direction to the dome portion to move the dome portion from the compressed state to the uncompressed state when the
(Continued)

(Amended)

flexible membrane has the second pliability. Alternatively, the dome portion moves in the second direction in response to a gravitational force.

23 Claims, 7 Drawing Sheets

Related U.S. Application Data

(60) Provisional application No. 61/880,270, filed on Sep. 20, 2013.

(51) Int. Cl.
*A47K 5/12* (2006.01)
*F04B 43/02* (2006.01)
*F04B 43/04* (2006.01)

(52) U.S. Cl.
CPC ..... *A47K 5/1217* (2013.01); *B05B 11/3028* (2013.01); *F04B 43/02* (2013.01); *F04B 43/04* (2013.01)

(56) References Cited

U.S. PATENT DOCUMENTS 6,619,512 B1 * 9/2003 Sayers ..... A47K 5/1207 222/181.3
7,258,533 B2 * 8/2007 Tanner ..... F04B 43/046 137/855
7,484,940 B2 * 2/2009 O'Neill ..... F04B 43/043 417/410.1
7,492,076 B2 2/2009 Heim et al.
7,806,301 B1 10/2010 Ciavarella et al. ..... B05B 11/3033 222/181.3
7,915,790 B2 3/2011 Heim et al.
7,931,173 B2 * 4/2011 Yuan ..... B05B 11/3032 222/207
8,072,121 B2 12/2011 Heim et al.
8,360,287 B2 * 1/2013 Ciavarella ..... A47K 5/14 222/209
8,991,648 B2 * 3/2015 Smith ..... A47K 5/1208 222/1
9,060,655 B2 * 6/2015 Iseri ..... A47K 5/1211
9,610,600 B2 * 4/2017 Ciavarella ..... A47K 5/1211
2007/0114247 A1 * 5/2007 Spriegel ..... A47K 5/1208 222/207
2008/0157631 A1 7/2008 Heim et al.
2008/0237266 A1 * 10/2008 Ciavarella ..... A47K 5/14 222/190
2009/0152995 A1 6/2009 Heim et al.
2009/0294477 A1 * 12/2009 Ciavarella ..... A47K 5/1208 222/190
2010/0102677 A1 4/2010 Heim et al.
2010/0221124 A1 9/2010 Ikushima et al.
2011/0044829 A1 * 2/2011 Stenberg ..... F04B 43/02 417/375
2013/0015209 A1 * 1/2013 Smith ..... A47K 5/1208 222/207
2013/0299518 A1 * 11/2013 McNulty ..... A47K 5/14 222/190
2014/0028153 A1 1/2014 Smirnov
2015/0144659 A1 * 5/2015 Smith ..... A47K 5/1208 222/153.14
2019/0022296 A1 * 1/2019 Ly ..... A61M 1/288

FOREIGN PATENT DOCUMENTS

WO 2008083325 A1 7/2008
WO 2008383325 A1 7/2008
WO 2010143084 A1 12/2010
WO 2015042235 A1 3/2015

OTHER PUBLICATIONS

Int. Search Report/Written Opinion cited in PCT Application No. PCT/US2015/021425 dated Jun. 26, 2015, 9 pgs.
Thummala, et al., "Analysis of Dielectric Electro Active Polymer Actuator and its High Voltage Driving Circuits". Published in: Power Modulator and High Voltage Conference (IPMHVC), 2012 IEEE International, pp. 458-461, Jun. 3-7, 2012. http://ieeexplore.ieee.org/xpl/login.jsp?tp=&arnumber=6518779&url=http%3A%2F%2Fieeexplore.ieee.org%2Fxpls%2Fabs_all.jsp%Farnumber%D6518779.

* cited by examiner

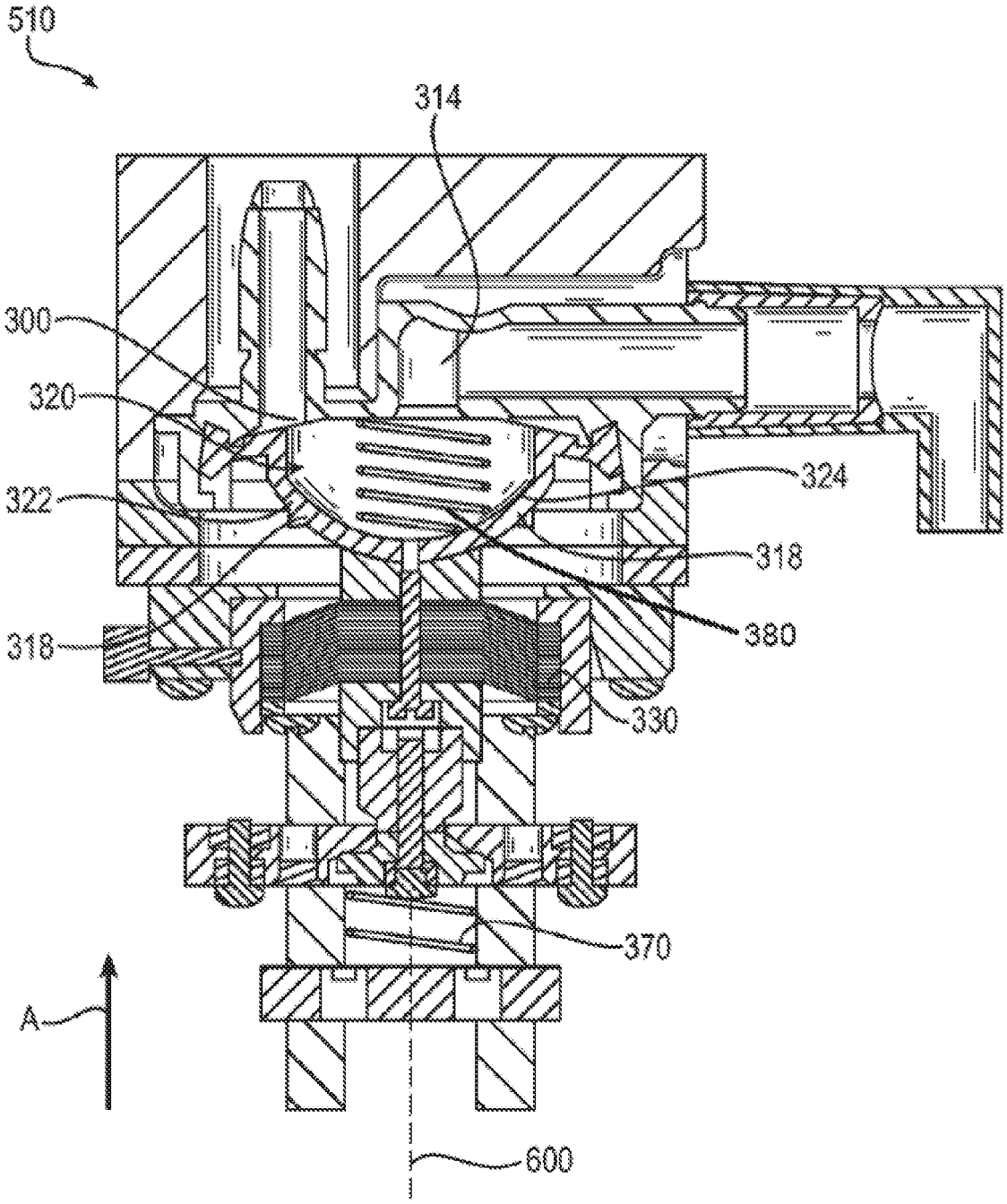
FIG. 6 (Amended)

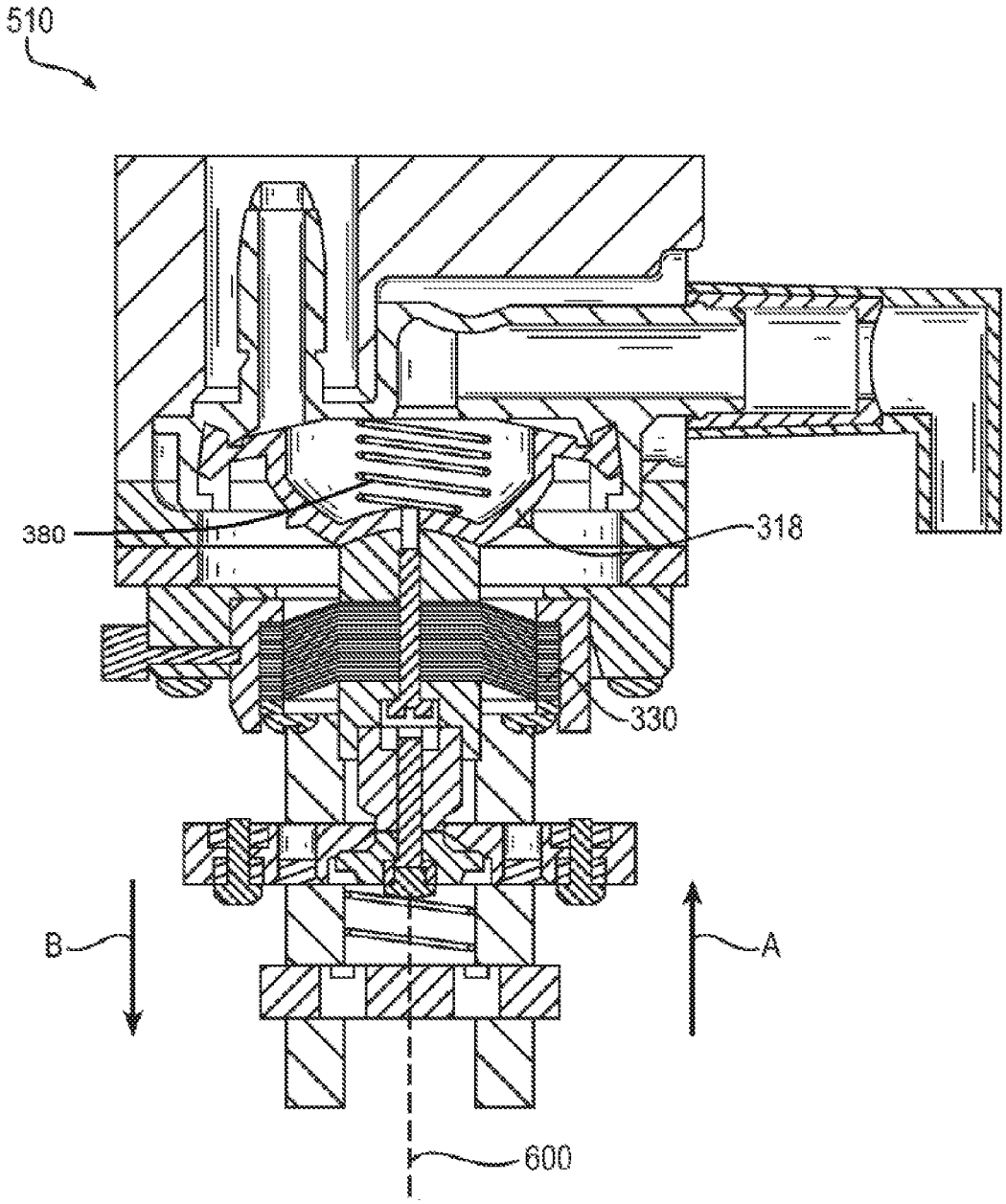
FIG. 7 (Amended)

DISPENSER USING ELECTRICALLY ACTIVATED MATERIAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a [continuation] *reissue of U.S. Non-Provisional Application 14/662,539, filed on Mar. 19, 2015 and issued as U.S. Pat. No. 9,517,484 on Dec. 13, 2016, which is a continuation-in-part* of and claims priority to U.S. Non-Provisional Application [Ser. No.] 14/489,850, [titled "DISPENSER PUMP USING ELECTRICALLY ACTIVATED MATERIAL" and] filed on Sep. 18, 2014 *and issued as U.S. Pat. No. 9,610,600 on Apr. 4, 2017*, which claims priority to U.S. Provisional Application 61/880,270, [titled "DISPENSER PUMP USING ELECTRICALLY ACTIVATED MATERIAL" and] filed on Sep. 20, 2013[, which is]. *U.S. Non-Provisional Applications 14/662,539 and 14/489,850 and U.S. Provisional Application 61/880,270 are* incorporated herein by reference.

TECHNICAL FIELD

The instant application is directed towards a pump. For example, the instant application is directed towards a pump having an electrically activated material.

BACKGROUND

Dispensing systems can dispense a sanitizing product to a user. Dispensing systems can be used, for example, in schools, hospitals, nursing homes, factories, restaurants, etc. To reduce drain on batteries that are supported by the dispensing systems, it would be advantageous to provide an automatic dispenser having a low power consumption profile and a small footprint, while maintaining the functional benefits of a touch-less dispenser.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a pump for dispensing fluid from a fluid reservoir of a dispenser is provided. The pump comprises a pump inlet through which the fluid is received from the fluid reservoir. The pump comprises a dome portion for storing the fluid received through the pump inlet. The dome portion is movable between a compressed state and an uncompressed state. The pump comprises a flexible membrane operatively associated with the dome portion. The flexible membrane has a first pliability when a first voltage is applied to the flexible membrane and has a second pliability when a second voltage is applied to the flexible membrane. The pump comprises a first biasing device configured to apply a first force in a first direction to the flexible membrane. The flexible membrane is configured to flex in the first direction in response to the first force when the flexible membrane has the first pliability. The flexible membrane is configured to move the dome portion from the uncompressed state to the compressed state when the flexible membrane flexes in the first direction. The pump comprises a second biasing device configured to apply a second force in a second direction to the dome portion to move the dome portion from the compressed state to the uncompressed state when the flexible membrane has the second pliability. The pump comprises a pump outlet through which the fluid is dispensed when the dome portion is in the compressed state.

In another example, a pump for dispensing fluid from a fluid reservoir of a dispenser is provided. The pump comprises a pump inlet through which the fluid is received from the fluid reservoir. The pump comprises a dome portion for storing the fluid received through the pump inlet. The dome portion is movable along a compression axis between a compressed state and an uncompressed state. The compression axis extends in a direction substantially parallel to a gravitational force of the Earth. The pump comprises a flexible membrane operatively associated with the dome portion, the flexible membrane having a first pliability when a first voltage is applied to the flexible membrane and having a second pliability when a second voltage is applied to the flexible membrane. The pump comprises a first biasing device configured to apply a first force in a first direction along the compression axis to the flexible membrane. The flexible membrane is configured to flex in the first direction in response to the first force when the flexible membrane has the first pliability. The flexible membrane is configured to move the dome portion from the uncompressed state to the compressed state when the flexible membrane flexes in the first direction. The pump comprises a pump outlet through which the fluid is dispensed when the dome portion is in the compressed state. The dome portion is configured to move in a second direction along the compression axis from the compressed state to the uncompressed state in response to the gravitational force when the flexible membrane has the second pliability.

In another example, a pump for dispensing fluid from a fluid reservoir of a dispenser is provided. The pump comprises a pump inlet through which the fluid is received from the fluid reservoir. The pump comprises a dome portion for storing the fluid received through the pump inlet. The dome portion is movable between a compressed state and an uncompressed state. The pump comprises a flexible membrane operatively associated with the dome portion. The flexible membrane has a first pliability when a first voltage is applied to the flexible membrane and has a second pliability when a second voltage is applied to the flexible membrane. The pump comprises a first biasing device configured to apply a first force in a first direction to the flexible membrane. The flexible membrane is configured to flex in the first direction in response to the first force when the flexible membrane has the first pliability. The flexible membrane is configured to move the dome portion from the uncompressed state to the compressed state when the flexible membrane flexes in the first direction. The pump comprises a pump outlet through which the fluid is dispensed when the dome portion is in the compressed state.

The following description and annexed drawings set forth certain illustrative aspects and implementations. These are indicative of but a few of the various ways in which one or more aspects can be employed. Other aspects, advantages, and/or novel features of the disclosure will become apparent from the following detailed description when considered in conjunction with the annexed drawings.

DESCRIPTION OF THE DRAWINGS

FIG. 6 is an illustration of an example pump for a dispensing system; and

FIG. 7 is an illustration of an example pump for a dispensing system.

DETAILED DESCRIPTION

Figure 1:
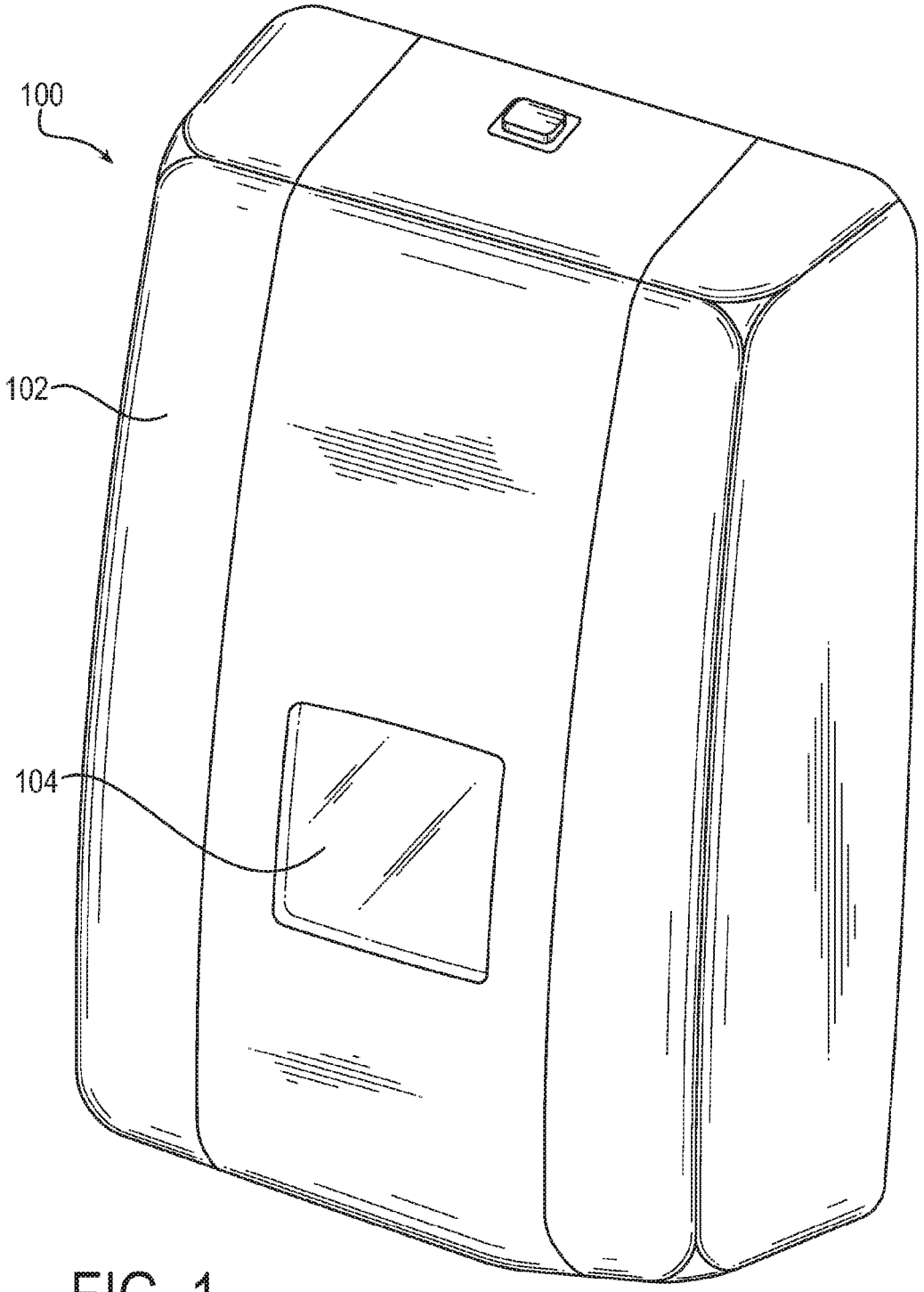
FIG. 1 is an illustration of an example dispensing system.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Referring to FIG. 1, an example dispenser 100 is illustrated. The dispenser 100 can be used for storing and/or dispensing an associated fluid. The dispenser 100 can be attached, for example, to a surface, such as a surface of a wall, ceiling, door, object, support structure, etc. The dispenser 100 can be used in environments such as prisons, jails, detention centers, mental health facilities, hospital, rehabilitation facilities, nursing homes, restaurants, schools, factories, warehouses, etc.

In an example, the dispenser 100 comprises a housing 102. The housing 102 comprises a container, enclosure, etc. within which portions of the dispenser 100 may be housed. In some examples, the housing 102 is substantially hollow so as to receive structures therein. In the illustrated example, the housing 102 comprises a rigid and/or durable structure or material, such as a plastic material, a metal material, or the like. In some examples, the housing 102 comprises a hinge, so as to allow for pivotal attachment of one or more portions of the housing 102. As such, access to an interior of the housing 102 is provided. In some examples, the housing 102 comprises a window 104 that is positioned to allow visual access (e.g., to service personnel) to an interior of the housing 102.

Figure 2:
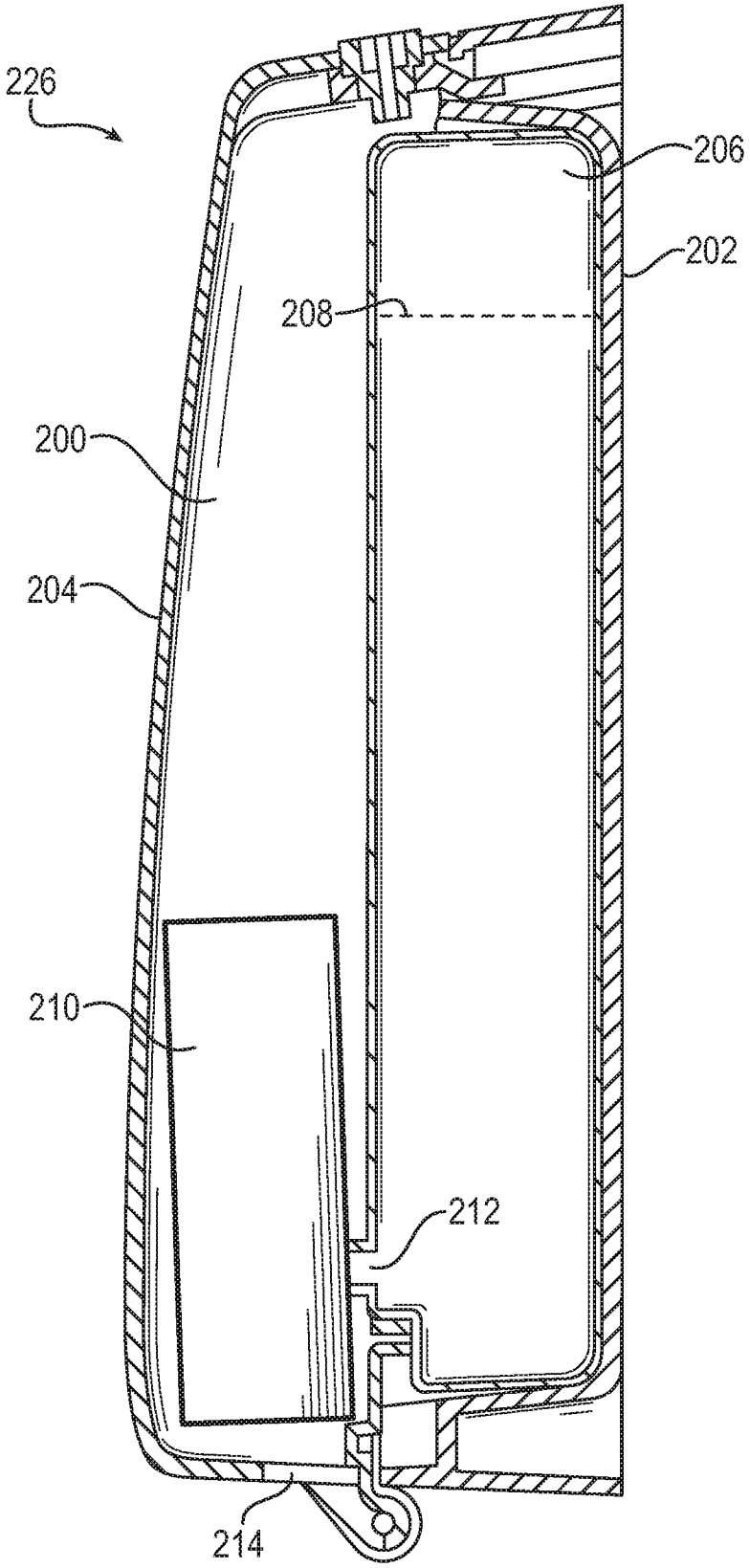
FIG. 2 is an illustration of an example dispensing system.

Turning to FIG. 2, an interior 200 of the dispenser 100 is illustrated. The dispenser 100 comprises a base 202 and a cover 204 that, together, form the housing 102. In an example, the base 202 and the cover 204 can define the interior 200 that holds the components of the dispenser 100. The base 202 may be substantially rigid and have a structural configuration that is suitable for supporting a number of different components. The base 202 may include mounting holes, brackets, or other similar attachment structures that are capable of receiving one or more fasteners. As such, the base 202 can be attached to a surface (e.g., wall, ceiling, door, object, support structure, etc.). In some examples, the cover 204 is pivotally attached to the base 202, such as with a hinge, for example.

The dispenser 100 comprises a fluid reservoir 206. The fluid reservoir 206 comprises a container, enclosure, vessel, pouch, etc. into which a fluid 208 can be received and from which the fluid 208 can be dispensed. The fluid reservoir 206 can be supported within the interior 200 of the housing 102. In some examples, the fluid 208 that is contained within the fluid reservoir 206 comprises soaps, cleaners, disinfectants, sanitizers, antiseptics, moisturizers, alcohol-infused liquids, or the like. In other examples, the fluid 208 comprises non-cleaning liquid or semi-liquid materials.

The dispenser 100 comprises a pump 210 for dispensing the fluid 208 from the fluid reservoir 206. The pump 210 can be supported within the interior 200 of the housing 102. It will be appreciated that the pump 210 is illustrated schematically in FIG. 2, as the pump 210 comprises a number of different structures, embodiments, constructions, locations, etc. In the example of FIG. 2, the illustrated position of the pump 210 is not intended to be limiting but, rather, comprises merely one example position of the pump 210 with respect to the fluid reservoir 206. Further details of the pump 210 will be illustrated and described with respect to FIGS. 3 and 4.

The fluid reservoir 206 defines a reservoir opening 212 that is in fluid communication with the pump 210. The reservoir opening 212 defines a space, gap, hole, passageway, channel, etc. through which the fluid 208 can exit the fluid reservoir 206. In the illustrated example, the pump 210 can be connected to the reservoir opening 212 such that the pump 210 can selectively receive the fluid 208 from the fluid reservoir 206. It will be appreciated that the reservoir opening 212 is not limited to the illustrated position, and in other examples, could be located higher or lower along the fluid reservoir 206 than as illustrated. For example, the reservoir opening 212 could be located near a bottom of the fluid reservoir 206 in another example.

The dispenser 100 defines a housing opening 214 within the housing 102. In the illustrated example, the housing opening 214 is located at a bottom or lower portion of the housing 102. However, such a location of the housing opening 214 is not intended to be limiting, as other locations are envisioned, such as along a side wall of the housing 102, for example. The housing opening 214 defines a space, gap, hole, passageway, channel, etc. through the housing 102. In some examples, the pump 210 is in fluid communication with the housing opening 214, such as by extending through the housing opening 214 and/or by being positioned adjacent to the housing opening 214. As such, the fluid 208 can be expelled from the pump 210 and through the housing opening 214.

Turning to FIG, 3, an example of the pump 210 is illustrated. In some examples, the pump 210, illustrated in FIG. 3, can be used in association with the dispenser 100 that is illustrated in FIGS. 1 and 2. For example, the pump 210, illustrated in FIG. 3, can be positioned at a similar location as the pump 210, illustrated in FIG. 2, where the pump 210 is in fluid communication with the fluid reservoir 206.

The pump 210 defines a pump inlet 300 through which the fluid 208 is received from the fluid reservoir 206. In an example, the pump inlet 300 of the pump 210 is in fluid communication with the reservoir opening 212 (e.g., illustrated in FIG. 2) of the fluid reservoir 206. As such, the fluid 208 can flow from the fluid reservoir 206, through the reservoir opening 212, and through a pump inlet 312.

The pump 210 defines a pump outlet 314 through which the fluid 208 can exit and/or be expelled from the pump 210. In the illustrated example, the fluid 208 can be dispensed through the pump outlet 314 when the pump 210 is in a compressed state. In some examples, the pump outlet 314 can be connected to a nozzle 316 for dispensing the fluid 208 from the pump 210. In the illustrated example, the pump inlet 312 is positioned at an upstream end of the pump 210 while the pump outlet 314 is positioned at a downstream end of the pump 210. As such, the fluid 208 can enter the pump 210 through the pump inlet 312, flow through the pump 210, and exit the pump 210 through the pump outlet 314. In this example, the pump inlet 312 is positioned at an upper end of the pump 210 while the pump outlet 314 is positioned at a lower end of the pump 210.

The pump 210 comprises a dome portion 318. The dome portion 318 defines an internal chamber 320 for storing the fluid 208 that is received through the pump inlet 312. The dome portion 318 is flexible and has at least some degree of elasticity, such that the dome portion 318 can be compressed. In an example, the dome portion 318 is movable (e.g., compressible) between a compressed state and an uncompressed state. In an example, the dome portion 318 has a dome wall 322 that defines the internal chamber 320, with an inner surface 324 of the dome wall 322 facing the internal chamber 320. The fluid 208 can be drawn into the internal chamber 320 of the dome portion 318 through the pump inlet 312. The fluid 208 can be expelled and/or dispensed from the internal chamber 320 of the dome portion 318 through the pump outlet 314. As such, the internal chamber 320 of the dome portion 318 is in fluid communication with the pump inlet 312 and the pump outlet 314.

The pump 210 comprises a flexible membrane 330 that is operatively associated with the dome portion 318. By being operatively associated, it will be appreciated that the flexible membrane 330 may or may not be in contact with the dome portion 318. In an example, the flexible membrane 330 can be spaced a distance apart from the dome portion 318, with the flexible membrane 330 selectively contacting and/or compressing the dome portion 318. In another example, the flexible membrane 330 can be in substantially constant contact with the dome portion 318, with the flexible membrane 330 selectively compressing the dome portion 318. As such, by being in operative association with the dome portion 318, the flexible membrane 330 can selectively compress the dome portion 318.

The flexible membrane 330 can comprise a flexible polymeric material. In an example, the flexible membrane 330 possesses memory and has a predetermined stiffness, such that the flexible membrane 330 is resistant to bending, flexing, etc. In an example, the flexible membrane 330 is made from Silicone, Polyurethane, or the like. However, other types of materials that have the requisite characteristics of stiffness and memory may also be used. As such, the flexible membrane 330 can be selectively displaced (e.g., by a biasing device), with the flexible membrane 330 tending to retain its original shape and returning to its unbiased configuration when the force is removed.

The flexible membrane 330 further comprises an electrically conductive material applied to opposing faces 332, 334 of the flexible membrane 330. In an embodiment, the electrically conductive material comprises carbon particles adhered to the surface of the flexible membrane 330 in a relatively thin layer. The faces 332, 334 of the flexible membrane 330 can sandwich one or more electrically conductive layers. The faces 332, 334 of the flexible membrane 330 can be connected to opposite polarity terminals of a direct current (DC) voltage source 336. When a threshold magnitude of voltage is applied to the flexible membrane 330, a stiffness of the flexible membrane 330 is altered by the attraction of the one or more electrically conductive layers pressing together. As such, the flexible membrane 330 can temporarily lose at least some stiffness so as to become more pliable and, therefore, subject to displacement. When the voltage potential is removed, the memory of the flexible membrane 330 can return the flexible membrane 330 to its original shape.

In some embodiments, the flexible membrane 330 may comprise two or more dielectric layers with electrically conductive layer sandwiched between dielectric layers. These layered structures can be in electrical communication with one another and may be driven with a single electrical drive voltage. In another embodiment, one or more of the electrically conductive layers can be patterned to define two or more active regions, such as a first active region 390 and a second active region 392, with an electrical voltage applied independently to each region. These two active regions 390, 392 can be defined by a pattern of electrodes to which voltage can be applied independently. For example, the first active region 390 can be located at a first side and/or a first location of the flexible membrane 330. The second active region 392 can be located at a second side and/or a second location of the flexible membrane 330. In the illustrated example, the first active region 390 may be located towards an upper side of the flexible membrane 330 while the second active region 392 may be located towards a lower side of the flexible membrane 330. These separate active region allow for relatively independent control of the flexible membrane 330 (e.g., by applying different voltages at different times to the different active regions 390, 392) to provide for peristaltic action.

In an example, the flexible membrane 330 can have a first pliability when a first voltage is applied to the flexible membrane 330 by the DC voltage source 336. The flexible membrane 330 can have a second pliability when a second voltage is applied to the flexible membrane 330 by the DC voltage source 336. In an example, the first pliability is different than the second pliability. The DC voltage source 336 can apply at least one of the first voltage or the second voltage to the flexible membrane 330. In some examples, the second voltage is about zero volts, such that the second pliability of the flexible membrane 330 can return the flexible membrane 330 to its original shape. In some examples, the first voltage is not zero volts (e.g., greater than zero volts), such that the first pliability of the flexible membrane 330 is more pliable than the second pliability. As such, when the flexible membrane 330 has the first pliability, the flexible membrane 330 can flex to a greater degree (e.g., a greater displacement) than when the flexible membrane 330 has the second pliability. In some embodiments, the applied voltage may be applied in a range between the first voltage that is required to attain the first pliability and the second voltage required to attain the second pliability in order to attain a pliability between the first pliability and the second pliability.

The pump 210 can comprise a membrane support structure 340. The membrane support structure 340 comprises, for example, a frame, a housing, a holder, or other similar support structure that can support the flexible membrane 330. In an example, the membrane support structure 340 can define an interior portion into which the flexible membrane 330 is received. In a possible example, the membrane support structure 340 can contact, engage, attach to, etc. an outer radial portion of the flexible membrane 330 so as to limit inadvertent movement, displacement, translation, etc. of the flexible membrane 330. In this example, the membrane support structure 340 can allow for a central portion of the flexible membrane 330 to flex (e.g., move) in response to the voltage potential applied by the DC voltage source 336. The membrane support structure 340 can limit flexing of the outer radial portion of the flexible membrane 330.

In some examples, the flexible membrane 330 defines a membrane opening 342 through which a first shaft 344 is configured to be received. In the illustrated example, the membrane opening 342 is located at or near a center of the flexible membrane 330, such that the first shaft 344 extends within the membrane support structure 340. The first shaft 344 can have a length that is greater than a length of the flexible membrane 330, such that the first shaft 344 extends into a first side of the flexible membrane 330 and exits out of a second side of the flexible membrane 330. In some examples, the first shaft 344 attaches the flexible membrane 330 to the dome portion 318, with the first shaft 344 extending between the flexible membrane 330 and the dome portion 318.

The first shaft 344 can be attached to a first support structure 350 and a second support structure 352. In an example, the first support structure 350 is located between the flexible membrane 330 and the dome portion 318. The first support structure 350 can be in contact with the first side of the flexible membrane 330. The second support structure 352 can be located on an opposite side of the flexible membrane 330 from the first support structure 350. In an example, the second support structure can be in contact with the second side of the flexible membrane 330. In an example, as the flexible membrane 330 flexes (e.g., after the voltage potential is applied by the DC voltage source 336 and a force is applied to the flexible membrane 330) the first shaft 344, the first support structure 350, and/or the second support structure 352 can move with the flexible membrane 330.

In the illustrated example, the flexible membrane 330 is spaced a first distance 346 apart from the dome portion 318. However, the flexible membrane 330 is not limited to such a position with respect to the dome portion 318. In other examples, the flexible membrane 330 can be located in closer proximity to (e.g., spaced less than the first distance 346) or farther proximity from (e.g., spaced greater than the first distance 346) the dome portion 318. In a possible example, the flexible membrane 330 can be positioned adjacent to and/or in contact with the dome portion 318, such that the first support structure 350 may not be provided (e.g., where the pump 210 does not comprise the support structure 350).

The pump 210 comprises a third support structure 360 and a fourth support structure 362. The third support structure 360 and the fourth support structure 362 are positioned on an opposite side of the second support structure 352 from the flexible membrane 330. In an example, the third support structure 360 is positioned adjacent to and/or in contact with the second support structure 352. The fourth support structure 362 is positioned adjacent to and/or in contact with the third support structure 360. The third support structure 360 and the fourth support structure 362 can be attached to each other, for example. In a possible example, a second shaft 364 can be provided for attaching the third support structure 360 and the fourth support structure 362 together. For example, the second shaft 364 can extend through the third support structure 360 and through the fourth support structure 362.

The pump 210 comprises a first biasing device 370. In an example, the first biasing device 370 comprises a spring, such as a helical spring, for example. The first biasing device 370 can be located adjacent to and/or in contact with the fourth support structure 362. As such, the third support structure 360 and the fourth support structure 362 can be positioned between the first biasing device 370 and the flexible membrane 330. The first biasing device 370 is configured to apply a first force in a first direction (e.g., illustrated with arrow A) to the flexible membrane 330. In this example, the first biasing device 370 can apply the first force to the third support structure 360 and the fourth support structure 362, which act upon the second support structure 352. As such, the first force, applied by the first biasing device 370, can be transmitted from the second support structure 352 to the flexible membrane 330.

In the illustrated example, the first biasing device 370 is spaced a second distance 372 apart from the flexible membrane 330. In such an example, the second support structure 352, the third support structure 360, and the fourth support structure 362 are positioned in the space (e.g., having the second distance 372) between the first biasing device 370 and the flexible membrane 330. Such a location and/or configuration of the first biasing device 370 is not intended to be limiting, however. In other examples, the first biasing device 370 can be located in closer proximity to (e.g., spaced less than the second distance 372) or farther proximity from (e.g., spaced greater than the second distance 372) the flexible membrane 330. In a possible example, the first biasing device 370 can be positioned adjacent to and/or in contact with the flexible membrane 330, such that the second support structure 352, the third support structure 360, and/or the fourth support structure 362 may not be provided (e.g., where the pump 210 does not comprise the second support structure 352, the third support structure 360, and/or the fourth support structure 362).

Initially, the DC voltage source 336 can apply the second voltage to the flexible membrane 330. In an example, the second voltage can be about zero volts. When the second voltage is applied, the flexible membrane 330 has the second pliability. With the second pliability, the flexible membrane 330 is relatively stiff and resistant to flexing, moving, etc. Accordingly, the flexible membrane 330, when having the second pliability, is relatively resistant to flexing in response to the first force applied in the first direction A by the first biasing device 370. That is, the first biasing device 370 can apply the first force to the flexible membrane 330 through the second support structure 352, the third support structure 360, and the fourth support structure 362. However, due to the flexible membrane 330 having the second pliability, the flexible membrane 330 is resistant to flexing in response to this first force.

Figure 4:
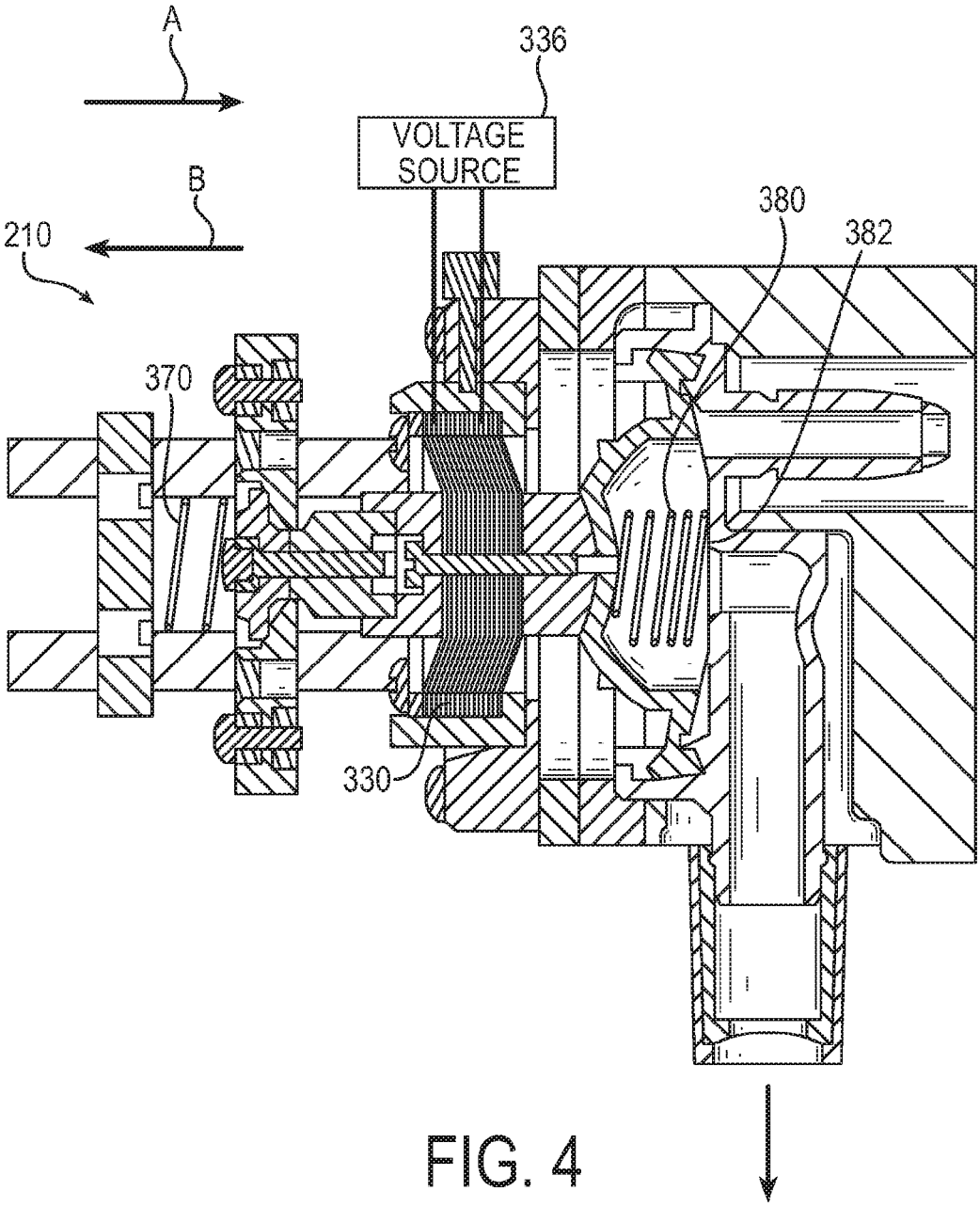
FIG. 4 is an illustration of an example pump for a dispensing system.

Turning to FIG. 4, when a dispense event is actuated, such as by a user, the DC voltage source 336 can apply the first voltage to the flexible membrane 330. In an example, the first voltage can be greater than zero volts, such as between about 2 kV to about 4 kV. When the first voltage is applied, the flexible membrane 330 has the first pliability. With the first pliability, the flexible membrane 330 is more flexible and pliable than when having the second pliability. Accordingly, the flexible membrane 330 can flex in the first direction A in response to the first force that is applied by the first biasing device 370. In such an example, the first biasing device 370 can apply the first force to the flexible membrane 330 through the second support structure 352, the third support structure 360, and the fourth support structure 362.

Figure 3:
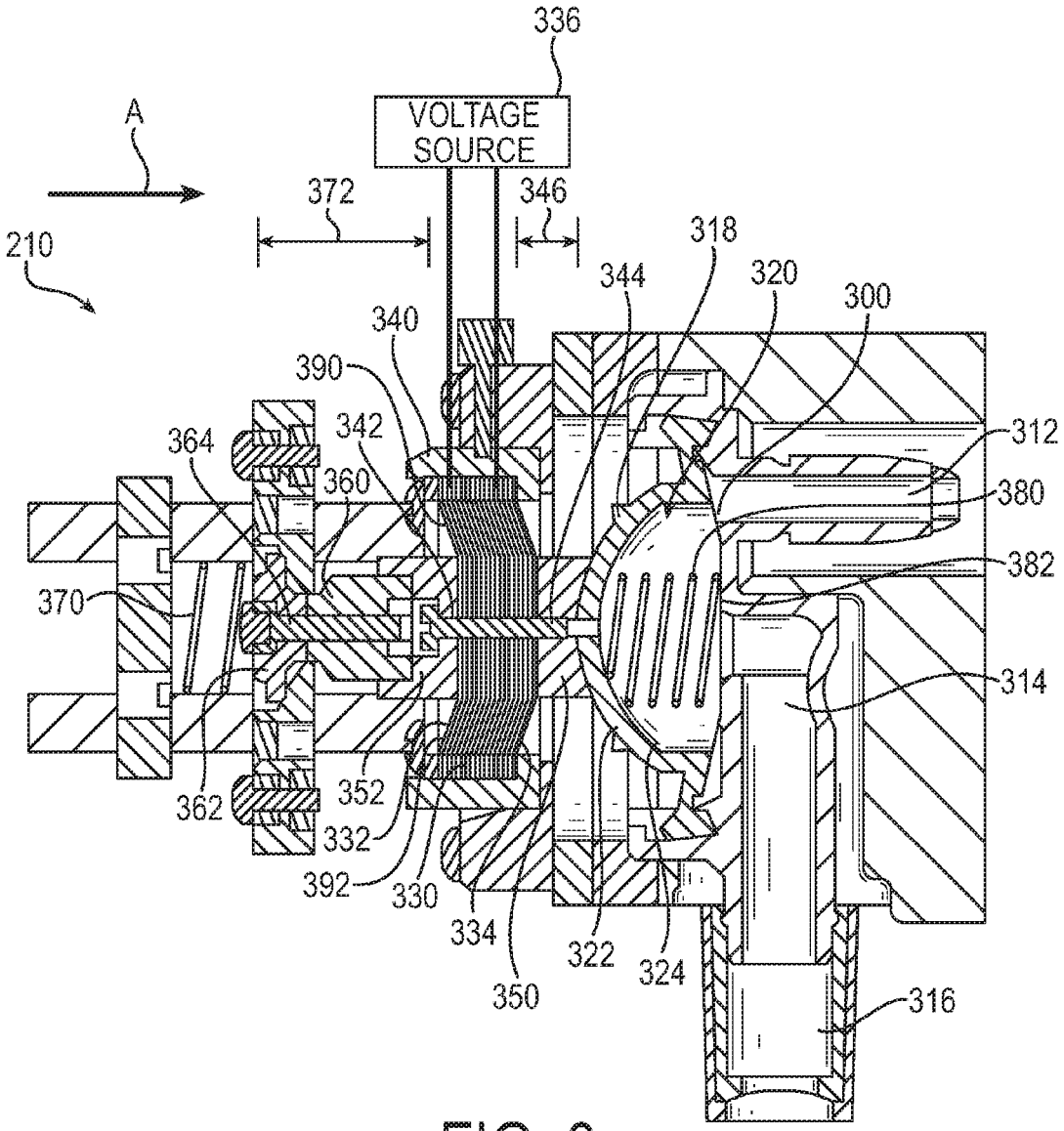
FIG. 3 is an illustration of an example pump for a dispensing system.

The flexible membrane 330, in response to the first force, can move in the first direction A. As a result of this movement, the first shaft 344 and the first support structure 350 can also move in the first direction A. The flexible membrane 330 can cause the dome portion 318 to move from an uncompressed state (e.g., as illustrated in FIG. 3) to a compressed state (e.g., as illustrated in FIG. 4) when the flexible membrane 330 flexes in the first direction A.

As the dome portion 318 is moved from the uncompressed state to the compressed state, the fluid 208 can be dispensed from the pump outlet 314. For example, compression of the dome portion 318 can cause at least some of the fluid 208 that is located within the internal chamber 320 of the dome portion 318 to exit the dome portion 318 and be dispensed from the pump outlet 314. The fluid 208 that is dispensed from the pump outlet 314 can be expelled through the nozzle 316 to a user.

To assist in returning the dome portion 318 from the compressed state to the uncompressed state, the pump 210 comprises a second biasing device 380. In a possible example, the second biasing device 380 can be positioned within the internal chamber 320 defined within the dome portion 318. In the illustrated example, the second biasing device 380 comprises a spring, such as a helical spring, for example. The second biasing device 380 can engage an internal wall 382 on one side and the inner surface 324 of the dome wall 322 of the dome portion 318 on an opposite side.

When the dome portion 318 is in the compressed state, the second biasing device 380 can apply a second force in a second direction (e.g., illustrated with arrow B) to the dome portion 318. For example, in the compressed state, the dome portion 318 can cause the second biasing device 380 to likewise compress. It will be appreciated that in this example, the first force that is applied by the first biasing device 370 in the first direction A may be greater than the second force that is applied by the second biasing device 380 in the second direction B. As such, the dome portion 318 can remain in the compressed state at least as long as the flexible membrane 330 is flexed in the first direction. When the DC voltage source 336 changes the applied voltage from the first voltage to the second voltage, the flexible membrane 330 can return to its original, non-flexed state. As such, the flexible membrane 330 can apply a third force to the first biasing device 370 to move the first biasing device 370 in the second direction B when the flexible membrane 330 has the second pliability. The flexible membrane 330 can move in the second direction B (e.g., right to left in FIG. 4) such that the flexible membrane 330 no longer applies a compressive force to the dome portion 318.

With the flexible membrane 330 having the second pliability and no longer applying the first force to the dome portion 318, the second biasing device 380 can move the dome portion 318 from the compressed state to the uncompressed state. In such an example, the second biasing device 380 can apply the second force in the second direction B to the dome portion 318. As illustrated, the second direction B is substantially opposite the first direction A. As the second biasing device 380 engages the dome wall 322, the second force that is applied by the second biasing device 380 may be sufficient to cause the dome portion 318 to move in the second direction B, thus moving the dome portion 318 to the uncompressed state.

As the dome portion 318 moves to the uncompressed state, a vacuum can be formed within the internal chamber 320 of the dome portion 318. This vacuum can cause at least some of the fluid 208 to be drawn into the dome portion 318 through the pump inlet 312. At this point, the dome portion 318 is in the uncompressed state and with at least some of the fluid 208 located within the internal chamber 320. Accordingly, a dispense event can be actuated, such as by a user, to cause the fluid 208 to be dispensed in a similar manner as described with respect to FIGS. 3 and 4.

It will be appreciated that the pump 210 is not limited to comprising a spring as the second biasing device 380. Rather, other structures, components, etc. can be used to assist in moving the dome portion 318 from the compressed state to the uncompressed state. In a possible example, the second biasing device 380 may comprise one or more magnets. For example, a first magnet can be positioned within the internal chamber 320 of the dome portion 318 while a second magnet can be positioned at an exterior of the dome portion 318. The first magnet and the second magnet can be arranged such that opposite polarities face each other. As such, in this example, the attraction between the first magnet and the second magnet can cause the first magnet to move towards the second magnet, thus causing the dome portion 318 to move in the second direction B.

Figure 5:
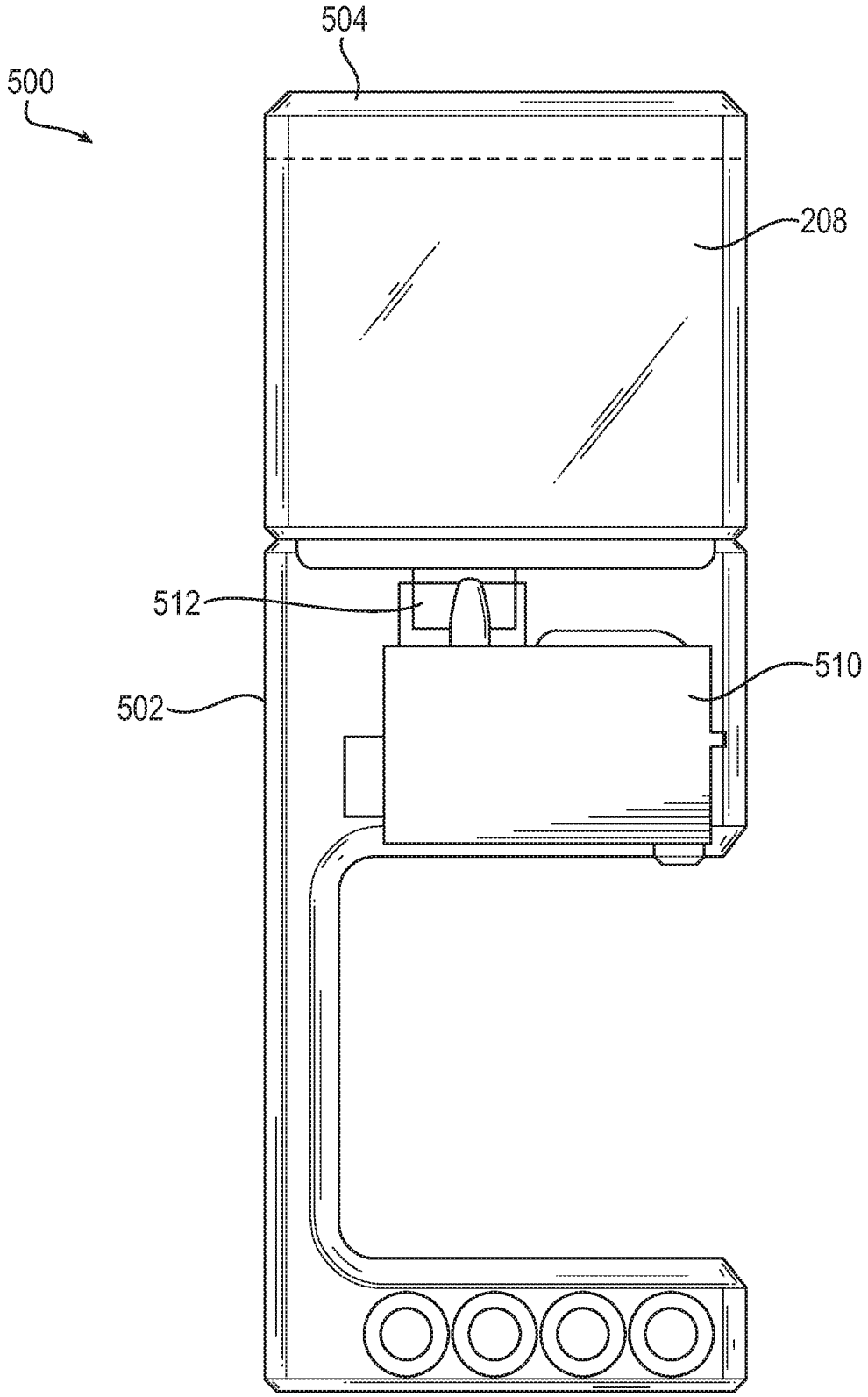
FIG. 5 is an illustration of an example dispensing system.

Turning to FIG. 5, a second example dispenser 500 (e.g., a vertical dispenser) is illustrated. The second dispenser 500 can be used for storing and/or dispensing the fluid 208. The second dispenser 500 comprises a housing 502 within which portions of the second dispenser 500 may be housed. As with the dispenser 100, the second dispenser 500 can comprise a fluid reservoir 504 into which the fluid 208 can be received and from which the fluid 208 can be dispensed.

The second dispenser 500 comprises a pump 510 for dispensing the fluid 208 from the fluid reservoir 504. In this example, the pump 510 can be supported below the fluid reservoir 504 and within an interior of the housing 502. It will be appreciated that the pump 510 is illustrated schematically in FIG. 5, as the pump 510 comprises a number of different structures, embodiments, constructions, etc. In the example of FIG. 5, the illustrated position of the pump 510 is not intended to be limiting, but, rather, comprises merely one example position of the pump 510 with respect to the fluid reservoir 504. Further details of the pump 510 will be illustrated and described with respect to FIGS. 6 and 7.

The fluid reservoir 504 defines a reservoir opening 512 that is in fluid communication with the pump 510. The reservoir opening 512 defines a space, gap, hole, passageway, channel, etc. through which the fluid 208 can exit the fluid reservoir 504. In the illustrated example, the pump 510 can be connected to the reservoir opening 512 such that the pump 210 can selectively receive the fluid 208 from the fluid reservoir 504.

Turning to FIG. 6, an example of the pump 510 is illustrated. In some examples, the pump 510, illustrated in FIG. 6, can be used in association with the second dispenser 500 that is illustrated in FIG. 5. For example, the pump 510, illustrated in FIG. 6, can be positioned at a similar location as the pump 510, illustrated in FIG. 5, where the pump 510 is in fluid communication with the fluid reservoir 504.

The pump 510 is similar in some respects to the pump 210 that is illustrated in FIGS. 3 and 4. In the examples of FIGS. 3 and 4, the pump 210 is oriented horizontally while in the examples of FIGS. 6 and 7, the pump 510 is oriented vertically. The pump 510 defines the pump inlet 300 through which the fluid 208 is received from the fluid reservoir 504. The pump 510 defines the pump outlet 314 through which the fluid 208 can exit and/or be expelled from the pump 510.

The pump 510 comprises the dome portion 318 that defines the internal chamber 320 for storing the fluid 208 that is received through the pump inlet 312. The dome portion comprises the dome wall 322 that defines the internal chamber 320, with the inner surface 324 of the dome wall 322 facing the internal chamber 320.

The dome portion 318 is movable along a compression axis 600 between the compressed state and the uncompressed state. In an example, the compression axis 600 extends in a direction that is substantially parallel to a gravitational force of the Earth. For example, as illustrated, the compression axis 600 can extend in a substantially vertical direction.

The pump 510 comprises the flexible membrane 330 that is operatively associated with the dome portion 318. As with the previous example, the flexible membrane 330 can have the first pliability when the first voltage is applied to the flexible membrane 330 by the DC voltage source 336. The flexible membrane 330 can have the second pliability when the second voltage is applied to the flexible membrane 330 by the DC voltage source 336. The first biasing device 370, of the pump 510, can apply the first force in the first direction A along the compression axis 600 to the flexible membrane 330. In this example, the first direction A is a substantially upward direction towards the fluid reservoir 504.

Turning to FIG. 7, when a dispense event is actuated, such as by a user, the DC voltage source 336 can apply the first voltage to the flexible membrane 330. When the first voltage is applied, the flexible membrane 330 has the first pliability. As such, the flexible membrane 330 can flex in the first direction A (e.g., upwardly) in response to the first force when the flexible membrane 330 has the first pliability. The flexible membrane 330 can move the dome portion 318 from the uncompressed state to the compressed state when the flexible membrane 330 flexes in the first direction A.

As the dome portion 318 is moved from the uncompressed state to the compressed state, the fluid 208 can be dispensed from the pump outlet 314. For example, compression of the dome portion 318 can cause at least some of the fluid 208 that is located within the internal chamber 320 of the dome portion 318 to exit the dome portion 318 and be dispensed from the pump outlet 314. The fluid 208 that is dispensed from the pump outlet 314 can be expelled through the nozzle 316 to a user.

The DC voltage source 336 can change the applied voltage from the first voltage to the second voltage at the conclusion of the dispense event. For example, when the DC voltage source 336 changes the applied voltage from the first voltage to the second voltage, the flexible membrane 330 can return to its original, non-flexed state. As such, the flexible membrane 330 can apply a third force to the first biasing device 370 to move the first biasing device in the second direction B when the flexible membrane 330 has the second pliability. Accordingly, when the flexible membrane 330 moves in the second direction B (e.g., downwardly in FIG. 7), the flexible membrane 330 may no longer apply the first force (e.g., compressive force) to the dome portion 318.

In some examples, after the flexible membrane 330 has returned to its original, non-flexed state, the dome portion 318 has a tendency to remain in the compressed state. The gravitational force of the Earth can be used to assist in returning the dome portion 318 from the compressed state to the uncompressed state. For example, since the dome portion 318 is movable along the compression axis 600 that is substantially vertical, the dome portion 318 can flex upwardly when moving from the uncompressed state to the compressed state. The dome portion 318 can therefore move in the second direction B (e.g., downwardly) when returning from the compressed state to the uncompressed state. As such, the dome portion 318 can move in the second direction B along the compression axis 600 from the compressed state to the uncompressed state in response to the gravitational force when the flexible membrane 330 has the second pliability.

[While the examples of FIGS. 6 and 7 illustrate the second dispenser 500 as not comprising a second biasing device (e.g., the second biasing device 380), the second dispenser 500 is not so limited. Rather, in] *In* some examples, the dome portion 318 of the second dispenser 500 may comprise the second biasing device 380. As such, the second biasing device 380, in addition to the gravitational force of the Earth, can together assist moving the dome portion 318 along the compression axis 600 from the compressed state to the uncompressed state.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A pump for dispensing fluid from a fluid reservoir of a dispenser, the pump comprising:

a pump inlet through which the fluid is received from the fluid reservoir;

a dome portion for storing the fluid received through the pump inlet, the dome portion movable between a compressed state and an uncompressed state and defining an internal chamber within which the fluid received through the pump inlet is stored;

a flexible membrane operatively associated with the dome portion, the flexible membrane having a first pliability when a first voltage is applied to the flexible membrane and having a second pliability when a second voltage is applied to the flexible membrane;

a first biasing device configured to apply a first force in a first direction to the flexible membrane, the flexible membrane configured to flex in the first direction in response to the first force when the flexible membrane has the first pliability, the first biasing device configured to move the dome portion from the uncompressed state to the compressed state when the flexible membrane has the first pliability;

a second biasing device disposed within the internal chamber, the second biasing device configured to apply a second force in a second direction to the dome portion to move the dome portion from the compressed state to the uncompressed state when the flexible membrane has the second pliability; and a pump outlet through which the fluid is dispensed when the dome portion is in the compressed state, the second biasing device encircling the pump outlet.

2. The pump of claim 1, wherein the flexible membrane is configured to apply a third force to the first biasing device to move the first biasing device in the second direction when the flexible membrane has the second pliability.

3. The pump of claim 1, wherein the second direction is substantially opposite the first direction.

4. The pump of claim 1, comprising a first shaft that attaches the flexible membrane to the dome portion, the first shaft extending between the flexible membrane and the dome portion.

5. The pump of claim 1, comprising a [second] shaft that attaches the first biasing device to the flexible membrane, the [second] shaft extending between the flexible membrane and the first biasing device.

6. The pump of claim 1, wherein the second biasing device is configured to engage an inner surface of a dome wall of the dome portion to apply the second force in the second direction to the dome portion.

7. The pump of claim 1, wherein the second biasing device comprises a spring.

8. The pump of claim 1, comprising a direct current (DC) voltage source for applying at least one of the first voltage or the second voltage to the flexible membrane.

9. A pump for dispensing fluid from a fluid reservoir of a dispenser, the pump comprising:

a pump inlet through which the fluid is received from the fluid reservoir;

a dome portion for storing the fluid received through the pump inlet, the dome portion movable between a compressed state and an uncompressed state;

a flexible membrane operatively associated with the dome portion, the flexible membrane having a first pliability when a first voltage is applied to the flexible membrane and having a second pliability when a second voltage is applied to the flexible membrane, the flexible membrane having a first side, which faces the dome portion, and a second side;

a support structure positioned on the second side of the flexible membrane, the support structure having a first support side, that engages the second side of the flexible membrane, and a second support side;

a first biasing device that engages the second support side of the support structure such that the first biasing device is spaced apart from the flexible membrane, the first biasing device configured to apply a first force in a first direction to the support structure, the flexible membrane configured to flex in the first direction in response to the first force on the support structure when the flexible membrane has the first pliability, the first biasing device configured to move the dome portion from the uncompressed state to the compressed state when the flexible membrane has the first pliability; and a pump outlet through which the fluid is dispensed when the dome portion is in the compressed state.

10. The pump of claim 9, wherein the flexible membrane is configured to apply a [third] *second* force to the first biasing device to move the first biasing device in a second direction when the flexible membrane has the second pliability.

11. The pump of claim 10, wherein the second direction is substantially opposite the first direction.

12. The pump of claim 9, comprising a first shaft that attaches the flexible membrane to the dome portion, the first shaft extending between the flexible membrane and the dome portion.

13. The pump of claim 9, comprising a direct current (DC) voltage source for applying at least one of the first voltage or the second voltage to the flexible membrane.

14. A pump for dispensing fluid from a fluid reservoir of a dispenser, the pump comprising:

a pump inlet through which the fluid is received from the fluid reservoir;

a dome portion for storing the fluid received through the pump inlet, the dome portion movable between a compressed state and an uncompressed state;

a flexible membrane operatively associated with the dome portion, the flexible membrane having a first pliability when a first voltage is applied to the flexible membrane and having a second pliability when a second voltage is applied to the flexible membrane, the flexible membrane having a first side, which faces the dome portion, and a second side;

a first biasing device positioned on the second side of the flexible membrane and configured to apply a first force in a first direction to the flexible membrane, the flexible membrane configured to flex in the first direction in response to the first force when the flexible membrane has the first pliability, the first biasing device configured to move the dome portion from the uncompressed state to the compressed state when the flexible membrane has the first pliability; and a pump outlet through which the fluid is dispensed when the dome portion is in the compressed state.

15. The pump of claim 14, wherein the flexible membrane comprises at least two dielectric layers in electrical communication with one another.

16. The pump of claim 14, wherein the flexible membrane comprises at least two active regions defined by a pattern of electrodes to which voltage can be applied independently.

17. The pump of claim 14, wherein the flexible membrane has a pliability between about the first pliability and the second pliability when a voltage applied to the flexible membrane is in a range between about the first voltage and the second voltage.

18. The pump of claim 1, the flexible membrane having a first side, which faces the dome portion, and a second side, which faces the first biasing device.

19. The pump of claim 18, comprising a *first* support structure positioned on the second side of the flexible membrane between the flexible membrane and the first biasing device.

20. The pump of claim 19, comprising a second support structure positioned on the first side of the flexible membrane between the flexible membrane and the dome portion.

21. The pump of claim 20, comprising a first shaft that attaches the *first* support structure and the second support structure, the first shaft extending through a membrane opening defined within the flexible membrane.

22. The pump of claim 9, comprising a second biasing device disposed within an internal chamber of the dome portion.

23. The pump of claim 14, wherein the first biasing device is spaced apart from the flexible membrane.

* * * * *